(12) United States Patent
Balakrishnan et al.

(10) Patent No.: US 7,518,817 B1
(45) Date of Patent: Apr. 14, 2009

(54) REDUCTION OF HIGH-FREQUENCY ELECTROMAGNETIC EMISSION QUASI-PEAKS FROM DISK DRIVES

(75) Inventors: Arun Balakrishnan, Lafayette, CO (US); John VanLaanen, Louisville, CO (US); Leo Lopez, Northglenn, CO (US); John Shaw, Thornton, CO (US); Bruce D. Buch, Westborough, MA (US); Claud L. Blevins, Westminster, CO (US)

(73) Assignee: Maxtor Corporation, Scotts Valley, CA (US)

( * ) Notice: Subject to any disclaimer, the term of this patent is extended or adjusted under 35 U.S.C. 154(b) by 352 days.

(21) Appl. No.: 11/484,864

(22) Filed: Jul. 10, 2006

Related U.S. Application Data

(60) Provisional application No. 60/697,583, filed on Jul. 8, 2005.

(51) Int. Cl.
*G11B 15/46* (2006.01)
(52) U.S. Cl. .................................... 360/73.03
(58) Field of Classification Search .............. 360/73.03, 360/73.01, 77.05, 78.04, 75, 51; 310/323.02; 720/703; 369/53.3; 451/285
See application file for complete search history.

(56) References Cited

U.S. PATENT DOCUMENTS

| | | | | | |
|---|---|---|---|---|---|
| 5,561,658 | A | * | 10/1996 | Nakamichi et al. | 720/703 |
| 5,810,648 | A | * | 9/1998 | Jiang et al. | 451/285 |
| 6,583,944 | B1 | * | 6/2003 | Wilson et al. | 360/51 |
| 6,664,712 | B2 | * | 12/2003 | Rayner et al. | 310/323.02 |
| 6,791,782 | B1 | * | 9/2004 | Codilian et al. | 360/73.03 |
| 6,954,324 | B1 | * | 10/2005 | Tu et al. | 360/73.03 |
| 7,035,188 | B2 | * | 4/2006 | Shen | 369/53.3 |
| 7,136,248 | B2 | * | 11/2006 | Tanner | 360/73.03 |
| 7,230,785 | B2 | * | 6/2007 | Itagaki et al. | 360/73.03 |
| 7,330,326 | B2 | * | 2/2008 | Hanks | 360/73.03 |

\* cited by examiner

*Primary Examiner*—Fred Tzeng
(74) *Attorney, Agent, or Firm*—Westman, Champlin & Kelly, P.A.

(57) ABSTRACT

A disk drive having reduced electromagnetic emission quasi-peaks is provided. The repetition rate of servo blocks or data is reduced, spread or otherwise altered. In one embodiment, the number of data zones is increased to achieve an emissions reduction goal. In one embodiment, the disk drive is configured to effectively have one track per zone. In one embodiment, the rotation rate of the disk is varied or the effective data bit density, as detected by the read/write head, is otherwise varied. In one embodiment, servo-sectors are intentionally positioned to vary the length, along the track, of inter-servo intervals.

20 Claims, 4 Drawing Sheets

FIG. 6
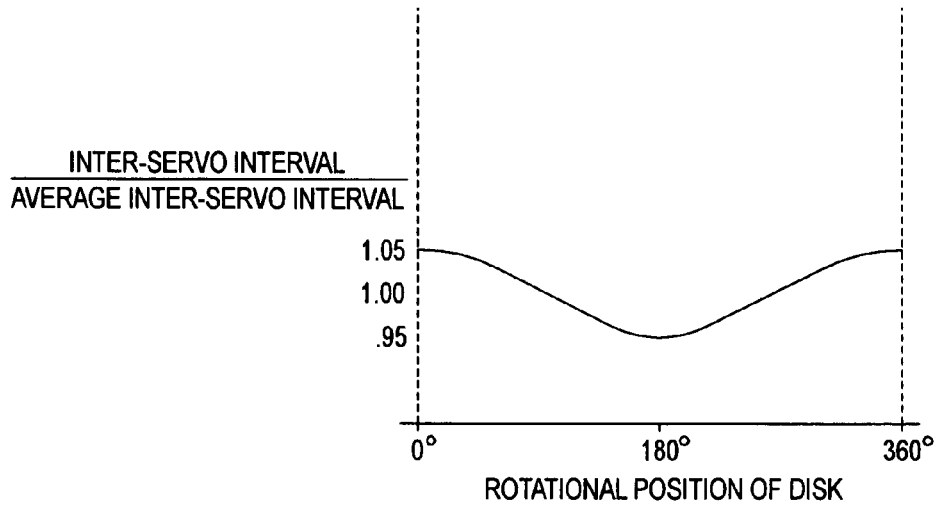
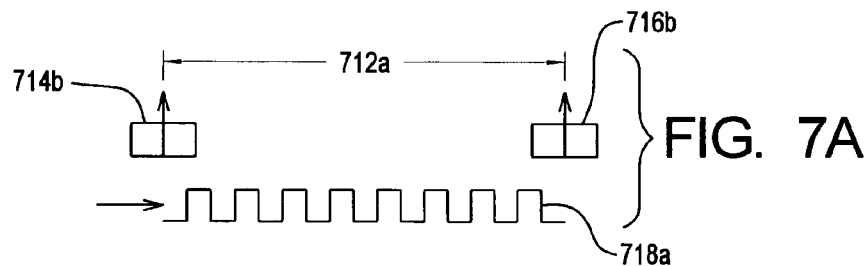
FIG. 7A
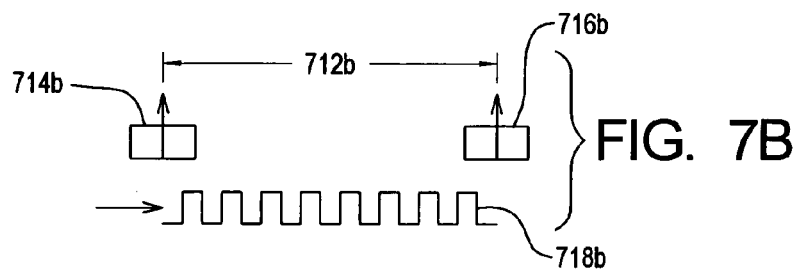
FIG. 7B
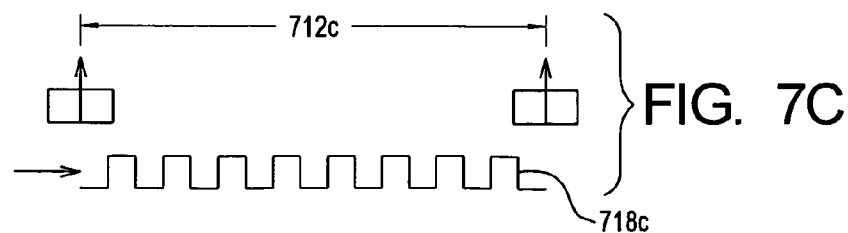
FIG. 7C

REDUCTION OF HIGH-FREQUENCY ELECTROMAGNETIC EMISSION QUASI-PEAKS FROM DISK DRIVES

CROSS-REFERENCE TO RELATED APPLICATIONS

Priority is claimed from U.S. Provisional Application Ser. No. 60/697,583 filed Jul. 8, 2005, which is incorporated herein by reference in its entirety.

FIELD OF THE INVENTION

The present invention is directed to a method, system and/or apparatus which can reduce the level or magnitude of electromagnetic emissions and, in particular, can reduce the magnitude or level of measured electromagnetic high-frequency quasi-peaks from disk drives or similar data storage devices.

BACKGROUND INFORMATION

Many electronic devices emit unintended and, generally undesirable, electromagnetic (EM) radiation. Private, national or international standards or testing groups have developed, and continue to develop, various testing procedures and/or standards related to the magnitude of such emissions. Such standards or testing can be used by potential purchasers for comparison purposes and/or for regulating the sale or use of various electronic devices. One recent trend has been for such testing or standards to be applied at increasingly higher-frequency ranges of the electromagnetic spectrum. A common standard that is implemented for testing is "FCC Part 15" in the United States and CISPR (Comite International Special des Pertubation Radioelectriques) in many parts of the world. According to CISPR-B, radiated emissions from a disk drive must be below 47 dBmV/m in the frequency range from 250 MHz through 1 GHz. Similar limits exist for other frequencies in the frequency range from 30 MHz through 1 GHz. As clock frequencies of disk drives increase, testing is being done at higher frequencies such as 6 GHz and more.

Some standards or testing procedures are intended to provide an indication of the magnitude of an EM emission which occurs as a carried signal riding on a lower frequency continuous wave (CW) signal. In one procedure, the measurement of the electromagnetic spectrum is "quasi-peaked." Generally speaking, in this procedure, the signal level is weighted based on the repetition frequency of the spectral components making up the signal. Accordingly, it would be useful to provide a method, system and/or apparatus such that quasi-peaks in the electromagnetic spectrum emissions from a disk drive are reduced, as compared to the level or magnitude of peaks in the absence of using such system, method or apparatus.

SUMMARY OF THE INVENTION

The present invention includes a recognition and appreciation of the existence and/or nature of problems in previous approaches, including those described herein.

According to one facet of the invention, a variation is provided in the frequency at which data bits, data sectors, servo bits and/or servo-sectors pass beneath the read/write head during testing and/or normal operation, the changes in frequency occurring track-wise, or from track-to-track, or both. In one embodiment, the number of recording zones on a disk is increased sufficiently to achieve a desired reduction in (or a desired maximum level of) quasi-peak magnitude for one or more frequencies or frequency ranges. In one embodiment, some or all of the data surface of the disk is provided in a zoneless fashion such that there is a track-to-track difference in the size or number of data sectors, the data density or the amount of data bits per track. In embodiment, the rotation rate of the disk is changed, preferably gradually over time, providing a consequent change in the frequency with which servo or data bits or sectors are encountered by the read/write head. In one embodiment, the servo-sectors are written to provide an amount of track-wise variation in the length between servo-sectors.

According to one embodiment of the present invention, a disk drive having reduced electromagnetic emission quasi-peaks is provided. The repetition rate of servo blocks or data is reduced, spread or otherwise altered. In one embodiment, the number of data zones is increased to achieve an emissions reduction goal. In one embodiment, the disk drive is configured to effectively have one track per zone. In one embodiment, the rotation rate of the disk is varied or the effective data bit density, as detected by the read/write head, is otherwise varied. In one embodiment, servo-sectors are intentionally positioned to vary the length, along the track, of inter-servo intervals.

BRIEF DESCRIPTION OF THE DRAWINGS

FIG. 6 is a graph of one manner of varying the inter-servo interval, normalized to the average inter-servo interval, along a disk track, expressed as the angular rotational position of the disk; and, FIGS. 7A, 7B and 7C are graphs depicting an example of varying inter-sector distances along a track according to an embodiment of the present invention.

DETAILED DESCRIPTION OF THE PREFERRED EMBODIMENT

Figure 1:
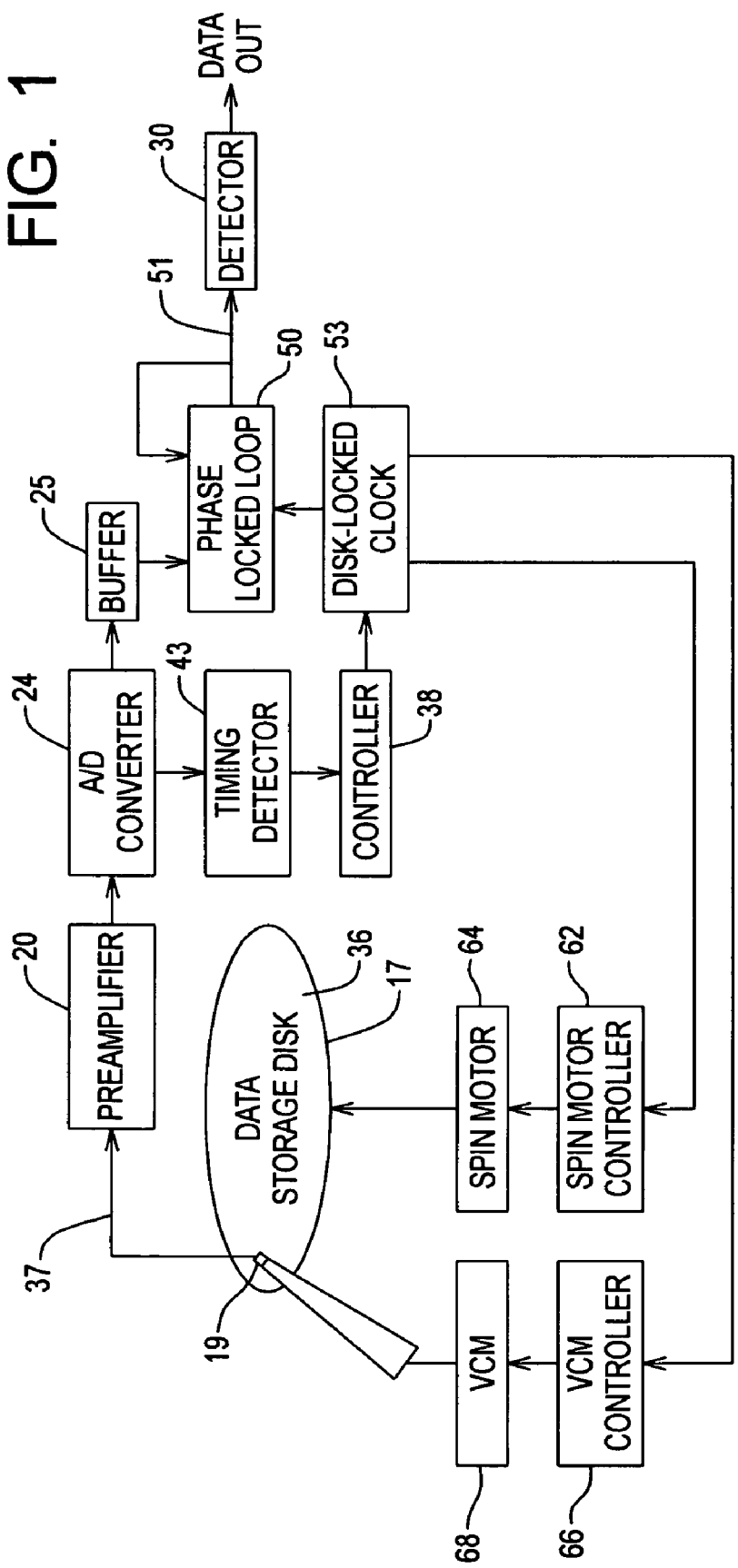
FIG. 1 is a simplified block diagram depicting certain relationships of selected components of a disk drive which can be used in connection with one or more embodiments of the present invention.

As depicted in FIG. 1, the data storage disk 17 is a magnetic disk, optical disk, or any other type of storage disk having concentric data storage tracks defined on one or both of its storage surfaces. Although only one data storage disk 17 is shown, more than one disk may be included in a disk drive.

Transducer head 19 may be a giant magneto-resistive (GMR) head, or similar device, that is capable of reading data from, and writing data to, data storage disk 17. Transducer head 19 is associated in a "flying" relationship over a storage surface 36 of disk 17, meaning that it is movable relative to, and over, storage surface 36 in order to read and write data on storage surface 36.

During reading, head 19 senses flux transitions as it "flies" in close proximity to a selected track on disk 17. These flux transitions 37 are provided to pre-amplifier 20. The resulting signal, after amplification and filtering, is subjected to sampling (including possible over-sampling) and quantization with a high-speed A/D converter 24. Data is stored in an asynchronous samples buffer 25. A Phase Locked Loop (PLL) 50 is used to reduce the phase difference (or "phase error") between the synchronous digital data and the clock signal. Detector 30 receives data 51 from the PLL and performs a detection operation on that data.

One way of determining timing for clocking data is to use a controller 38, timing detector 43 and a disk-locked clock 53. Timing detector 43 measures timing of spokes on data storage disk 17 (via data obtained from A/D converter 24) and provides the resulting timing information to controller 38. Controller 38 executes a routine in software (in one embodiment a PLL) to provide a clock update signal based on the timing information from timing detector 43. The clock update signal is provided to disk-locked clock 53, where the clock signal generated by disk-locked clock 53 is updated based on the timing signal. In general, timing may be obtained from disk-locked clock 53 at any point in the operation of the disk drive. As shown in the depicted embodiment, the disk-locked clock can be used as one of the timing inputs to the spin motor controller 62 for controlling the spin motor 64 or to the Voice Coil Motor (VCM) controller 66 for controlling the VCM 68.

Although a number of formats are used for recording data, a common approach involves providing a disk with a relatively large number of concentric tracks. The tracks which are used for data read and write have a number of servo-sector blocks spaced (typically, evenly) around the track, defining a plurality of inter-servo regions or distances along the track. Data bits are written in the inter-servo regions.

Since the total lengths of the tracks increase with the radial distance from the disk rotation axis, it is common practice, in modern hard disk drives (HDDs), to provide a larger number of sectors (and thus a larger number of servo-sector marks or blocks) for at least some of the more radially outward tracks, compared to the more radially inward tracks. In modern HDDs, this is typically achieved by having a fixed number of servo blocks per track for each of a plurality of groups of tracks or "zones". For example, each of the tracks in the radially*inward—most zone might have, e.g., 350 sector marks while the adjacent zone might have 380 sector marks and so forth. The number of sector marks will depend on a number of factors including size of the disk and various formatting choices. However, it is not uncommon for the number of sector marks per track to be somewhere between several hundred marks and about 10,000 or more marks per track. Typical disk drives have 16 zones. With each zone having between several hundred and many thousands of tracks. In general, it is believed that previous approaches have been based on appreciating how such use of zones can provide greater capacity for outer tracks. In general, only enough zones consistent with these purposes are typically used, e.g. to avoid the increased complexity of circuitry and/or logic involved in providing a relatively large number of zones.

One facet of the present invention involves the recognition that there is an additional benefit to increasing the number of zones, namely the reduction of emission quasi-peaks, which may justify a level of circuitry or logical complexity greater than that typically used to merely provide outer track data capacity.

Figure 2:
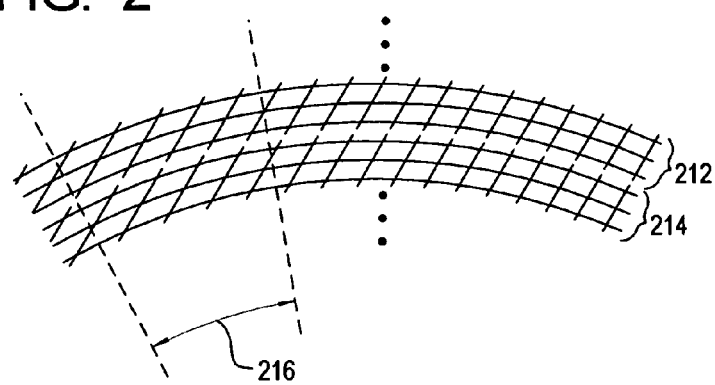
FIG. 2 illustrates relative locations of servo blocks along tracks of two adjacent zones of a disk.

As seen in the simplified diagram of FIG. 2, because there are more sector marks per (track-wise) unit of track length for an outer track an outer zone 212 compared to the tracks in an inner zone 214, the frequency or repetition rate of sector marks (from the viewpoint of the read/write head) during a disk rotation of 5 degrees 216 will be larger for the first zone 212 than for the second zone 214. However, the repetition rate within either of the zones 212, 214 is substantially the same for all tracks within that zone.

It has been found that there are significant high-frequency electromagnetic emission peaks or quasi-peaks for at least some HDDs, which appear to correspond to the frequency of servo-sectors (within zones) and/or data (and associated) bits in the inter-servo regions (i.e. "data bits").

According to one embodiment of the present invention, the magnitude of one or more quasi-peaks in the emissions spectrum is reduced by configuring the HDD so that the average amount of time which is spent in a given zone (each of which has a fixed repetition rate) is reduced. In the embodiment depicted in FIG. 3, this is achieved by increasing the number of zones e.g., so as to meet a particular target (i.e. so that emission quasi-peaks are less than a desired maximum value). For example, according to one embodiment of the invention, reduction in magnitude of quasi-peaks will be achieved by increasing the number of zones from 16 to, e.g., 32 (or more) zones.

Figure 3:
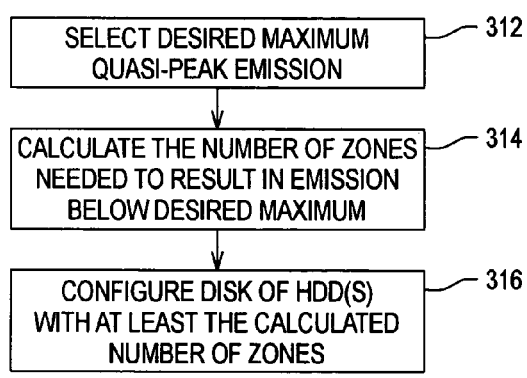
FIG. 3 depicts a procedure for reducing EM emissions quasi-peaks according to an embodiment of the present invention.

In the embodiment depicted in FIG. 3, the desired maximum quasi-peaks emission level is selected 312. This selection may be based on CSIR or other standards, on quality targets and the like. The number of zones which are needed to result in an emission below such a desired maximum is calculated 314. One way of calculating the number of zones is to base calculations on empirical evidence, e.g., testing disks with varying number of zones and extrapolating or interpolating results to determine the number of zones which will reach the desired target. HDDs, e.g., in commercial or production mode, can than be configured with at least the calculated number of zones.

At least theoretically, it is possible to provide a number of zones which are equal to the number of tracks, i.e., such that no two consecutive tracks have the same repetition rate. Although it is believed this approach would be, at least theoretically, operable and is capable of being constructed, it is believed likely that the logical or circuitry complexity involved in such a large number of zones could make this embodiment economically undesirable in present circumstances.

Figure 4:
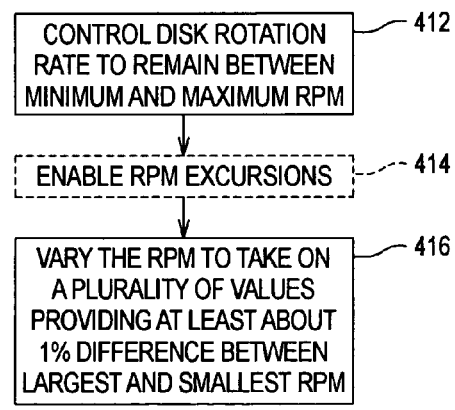
FIG. 4 depicts a procedure for reducing EM emissions quasi-peaks according to an embodiment of the present invention.

In the embodiment of FIG. 4, the repetition rate is varied by varying the rotation rate (e.g., revolutions per minute or "rpm") of the disk. As depicted in FIG. 4, an HDD may be configured to have the ability to provide a rotation rate anywhere between a minimum and maximum rpm 412. This is a function which can be provided, e.g., by a spin motor controller 62, as will be understood by those skilled in the art. Optionally, the HDD may be provided with the ability to enable or disable the rpm excursions described herein 414. In one embodiment, enablement can be achieved by sending a control signal from a host computer (or other host device) to the HDD.

During testing or normal operation, the HDD will provide commands to the spin motor controller 62 so as to vary the rpm of the disk 416 so as to take on a plurality of rpm values. Since a goal is to change what would otherwise be a substantially constant repetition rate into a varying repetition rate, the size of the rpm excursions and the frequency at which rpm changes are made will depend on the frequency or frequencies of the quasi-peaks which are to be reduced and the amount by which they are to be reduced. It is possible to determine the effect of the rpm excursions on emission quasi-peaks empirically, by modeling, or through theoretical calculations. As one example, the spin motor controller can be configured to provide rpm excursions which vary from a maximum rpm to a minimum rpm and back to the maximum rpm in a substantially sinusoidally shaped pattern within each rotation of the disk. In one example, the maximum and minimum rpms differ by about one percent of the average rpm.

Those of skill in the art will understand how to provide other magnitudes or frequencies of rpm excursions so as to achieve various electromagnetic emissions goals. Preferably the system is configured to be able to continue to perform normal read/write operations despite the changing rpm. For example, systems based on a disk-locked clock (e.g., as depicted in FIG. 1) will generally not be impacted by changing rpms. At a level external to the drive, it is expected that data frequencies will track the clock and, therefore, will also move around. It is believed this will make quasi-peaks very small or immeasurable.

In conventional devices, servo fields are written on the media such that, for any given track, the servo-to-servo interval is substantially constant. As depicted in FIG. 6, according to one embodiment of the invention, servo fields are written on the media to provide variation in the servo-to-servo intervals (normalized, in FIG. 6, to the average inter-servo interval) as the track is traversed. The HDD is provided with a disk-locked clock configuration, or other circuitry, to follow such variations so that data written between compressed intervals is written with a higher frequency and data written between expanded intervals is written with a lower frequency. The servo-to-servo interval is measured at each servo field to determine how these intervals are varying and the control loop adjusts a data writing clock frequency so as to substantially maintain a frequency which will provide a constant number of clock periods (and thus data bits) for all inter-servo intervals on the track.

As depicted in FIGS. 7A, 7B and 7C, an interval 712B between adjacent servo-blocks 716B, 714B which is compressed (with respect to a nominal or average interval 712A between servo blocks 714B, 716B), has data written therein according to a data clock 718B. The data clock 718B for the compressed interval has a frequency which is higher than the data clock frequency 718A used during an average or nominal inter-servo interval. Similarly, a data clock 718C used during traverse of an expanded interval 712A has a frequency which is lower than the nominal interval data clock 718A. Varying the data clock frequency over the course of each revolution spreads the spectrum of read/write data clocks and lowers the (measured) energy of electromagnetic emissions at corresponding frequencies.

Some disk-locked clock systems adjust the anticipated frequency for reading servo fields as the data frequency is adjusted up or down, so as to match the servo-interval variation. In the deliberate varying of servo-intervals as described above, the servo frequency stays constant regardless of the servo-interval variation. Thus, when the intervals vary from nominal, a conventional servo-frequency acquisition mechanism used to detect information in servo fields would anticipate a frequency different from what will actually be read from the servo field. However, the slight variation frequency that is practical for this method (such as less than 10 percent, preferably less than 5 percent, more preferably less than about 2 percent and even more preferably less than about 1 percent of the average inter-servo interval) will typically have negligible impact on servo-data detection. Further, disk-locked clock approaches can be modified for compatibility with servo fields of constant frequency, yet varying intervals.

Figure 5A:
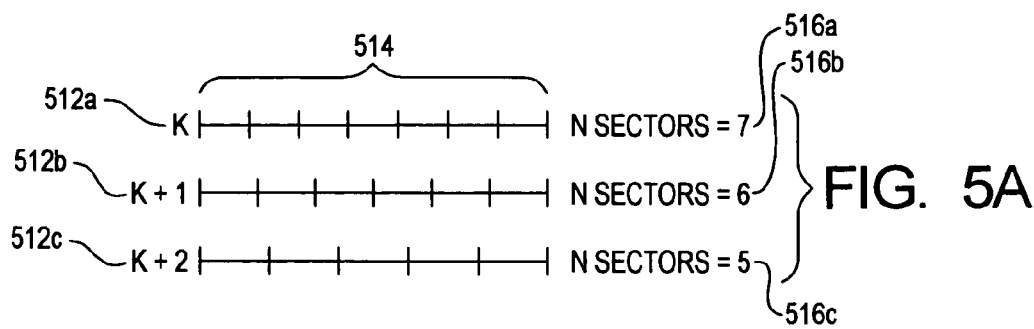
FIG. 5A depicts a simplified example of varying inter-sector distance according to an embodiment of the present invention.
Figure 5B:
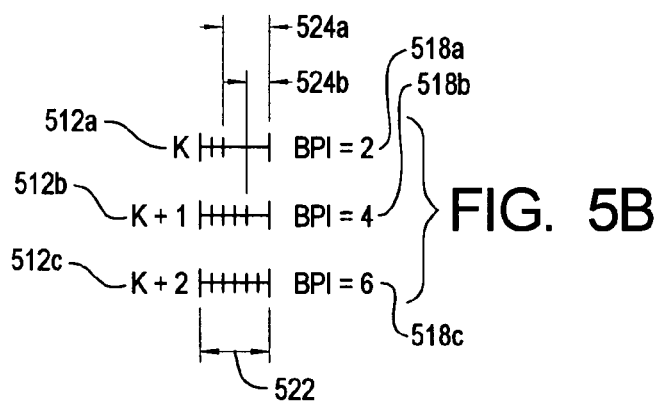
FIG. 5B depicts a simplified example of varying data density in adjacent tracks according to an embodiment of the present invention.
Figure 5C:
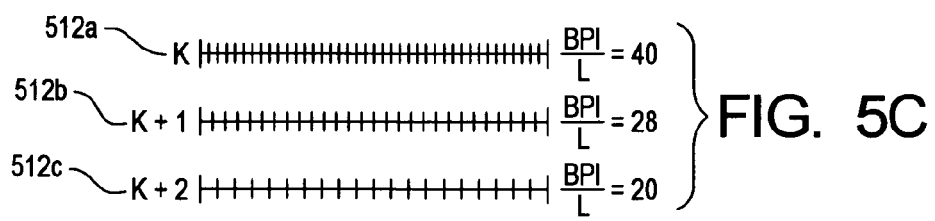
FIG. 5C depicts a simplified example of providing differing bits per unit length in adjacent tracks according to an embodiment of the present invention.

As depicted in FIGS. 5A, 5B and 5C, when the number of zones is equal to the number of tracks over at least a part of the data recording surface, each track can have a different number of servo blocks per arcuate unit track length and/or a different number of bits per track or per unit track length. In FIG. 5A, three adjacent tracks number K, K+1 and K+2 512A, 512B, and 512C have, over a given arcuate track section 514 (illustrated as a straight line in FIGS. 5A, 5B and 5C, for convenience) different numbers of servo-sectors or servo blocks 516A, 516B and 516C.

As illustrated in FIG. 5B, it is possible to provide different data densities per unit track length, regardless of whether the inter-servo interval is varied from track to track 522, e.g., by providing different amounts of unused data field 524A, B in the inter-servo intervals of adjacent tracks. As depicted in FIG. 5C, whether inter-servo intervals or unused data sector regions (or combination) are provided, if three or more adjacent tracks 512A, 512B and 512C have a different number of data bits per unit length of track or have different number of total bits per track divided by track length, the repetition rate will be different for each of these three adjacent tracks. Thus, a lower measured quasi-peak level will be provided, compared to the quasi-peak level that would have been obtained if all three tracks had the same data bit and/or servo-block frequency.

A number of variations and modifications of the invention can be used. Although several embodiments of the invention have been described, it is possible to provide combinations of two or more of the embodiments. Although the description has included a description of several methods, it is possible to provide embodiments using other methods including methods having more or fewer or different steps and/or steps which are performed in an order different from that depicted and described. The present invention can be used in connection with any of a plurality of data disk devices including disk drives which are internal to, external to or otherwise associated with a personal computer, network computer, mainframe computer or other device, disk drives which are associated with or contained in a camera, video recorder, cellular or other telephone, personal digital assistants, portable or personal music, video or gaming device and the like. Although the present invention has been described in the context of electromagnetic data disk read/write devices, some or all aspects of the invention can be used in connection with other devices including compact disks (CDs), digital versatile disks (DVDs) or other optical disks, and the like. Although enable/disable of the emission quasi-peak reduction processes was described in connection with the embodiment depicted in FIG. 4, it is possible to provide enablement/disablement in connection with the other embodiments described herein. It may be desirable to provide different rpm excursion values at different times (such as providing different frequencies or magnitudes for different zones).

In light of the above description, a number of advantages of the present invention can be seen. The present invention can reduce certain electromagnetic emission levels and, in particular, can reduce measured high-frequency emission quasi-peaks. The present invention can make it possible to reduce the amount shielding or other components or processes that might otherwise be needed to achieve emissions goals or to comply with one or more emissions standards. At least some embodiments of the invention make it possible for the amount of reduction, or the engagement/disengagement of emission reduction techniques or devices, to be selected, e.g., by the user.

The present invention, in various embodiments, includes components, methods, processes, systems and/or apparatuses substantially as depicted and described herein, including various embodiments, sub-combinations, and subsets thereof. Those with skill in the art will understand how to make and use the present invention after understanding the present disclosure. The present invention, and various embodiments, includes providing devices and processes in the absence of items not depicted and/or described herein or in various embodiments hereof, including in the absence of such items as may have been used in previous devices or processes, e.g., for improving performance, achieving ease of implementation and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the forms or form disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. Apparatus for use in a disk drive having a disk and a read/write head comprising:
   first circuitry which effectively controls a rotation rate of said disk, wherein the first circuitry receives commands to vary the rotation rate over time relative to an average rotation rate;
   second circuitry, coupled to and controlled by said first circuitry in response to the commands, which is configured to vary the rotation rate a first direction away from the average rotation rate for a first period of time in response to at least a first of the commands and to vary the rotation rate in a second, opposite direction away from the average rotation rate for a second period of time in response to at least a second of the commands.

2. Apparatus, as claimed in claim 1, wherein said second circuitry changes the rotation rate by a minimum magnitude of about 1 percent of the average rotation rate.

3. Apparatus, as claimed in claim 1, wherein said disk has a plurality of tracks grouped into a plurality of zones, wherein said second circuitry further provides a change in said rotation rate at least once during a time said head is in a given one of said zones in response to at least one of the commands.

4. Apparatus, as claimed in 1, wherein said second circuitry further provides a change in said rotation rate at least one during a rotation of said disk in response to at least one of the commands.

5. Apparatus, as claimed in claim 1, wherein said disk has a plurality of sectors, defining inter-sector intervals, and wherein said second circuitry is configured to vary the rotation rate in response to the commands such that the average rotation rate throughout any of said inter-sector intervals is different from the average rotation rate through a subsequent inter-servo interval.

6. Apparatus, as claimed in claim 1, wherein the rotation rate of said disk varies by no more than about 2 percent of the average rotation rate of said disk.

7. Apparatus, as claimed in claim 1, wherein the first circuitry is configured to cause the second circuitry to vary the rotation rate from a maximum rotations per minute (rpm) to a minimum rpm and back to the maximum rpm in a substantially sinusoidally shaped pattern, in response to the commands.

8. Apparatus, as claimed in claim 7, wherein the first circuitry is configured to cause the second circuitry to vary the rotation rate from the maximum rpm to the minimum rpm and back to the maximum rpm within each rotation of the disk, in response to the commands.

9. Apparatus, as claimed in claim 7, wherein the maximum rpm and the minimum rpm differ by one percent to two percent of the average rpm.

10. Apparatus, as claimed in claim 1, wherein the commands are configured to vary the rotation rate by a pattern over time that is a function of quasi-peaks in electromagnetic emissions from the disk drive.

11. A data storage device comprising:
    a rotatable data storage medium;
    a motor controller, which receives commands to vary a rotation rate of the medium over time relative to an average rotation rate; and
    a motor coupled to the medium and controlled by the motor controller, which is configured to vary the rotation rate a first direction away from the average rotation rate for a first period of time in response to at least a first of the commands and to vary the rotation rate in a second, opposite direction away from the average rotation rate for a second period of time in response to at least a second of the commands.

12. The data storage device of claim 11, wherein the motor changes the rotation rate by a minimum magnitude of about 1 percent of the average rotation rate.

13. The data storage device of claim 11, and further comprising a read/write head and wherein said medium has a plurality of tracks grouped into a plurality of zones, wherein the motor further provides a change in the rotation rate at least once during a time the head is in a given one of the zones in response to at least one of the commands.

14. The data storage device of claim 11, wherein the motor further provides a change in the rotation rate at least one during a rotation of the medium in response to at least one of the commands.

15. The data storage device of claim 11, wherein the medium has a plurality of sectors, defining inter-sector intervals, and wherein the motor is configured to vary the rotation rate in response to the commands such that the average rotation rate throughout any of said inter-sector intervals is different from the average rotation rate through a subsequent inter-servo interval.

16. The data storage device of claim 11, wherein the rotation rate of the medium varies by no more than about 2 percent of the average rotation rate of the medium.

17. The data storage device of claim 11, wherein the motor controller causes the motor to vary the rotation rate from a maximum rotations per minute (rpm) to a minimum rpm and back to the maximum rpm in a substantially sinusoidally shaped pattern, in response to the commands.

18. The data storage device of claim 17, wherein the motor controller is configured to cause the motor to vary the rotation rate from the maximum rpm to the minimum rpm and back to the maximum rpm within each rotation of the disk, in response to the commands.

19. The data storage device of claim 17, wherein the maximum rpm and the minimum rpm differ by one percent to two percent of the average rpm.

20. The data storage device of claim 11, wherein the commands are configured to vary the rotation rate by a pattern over time that is a function of quasi-peaks in electromagnetic emissions from the data storage device.

* * * * *